(No Model.) 2 Sheets—Sheet 1.

W. R. BROWN.
ATTACHMENT FOR WHEEL CULTIVATORS.

No. 363,278. Patented May 17, 1887.

Witnesses:
F. L. Ourand
Benj. G. Cool

Inventor
William R. Brown,
By his Attorneys
Louis Bagger & Co (No Model.) 2 Sheets—Sheet 2.
W. R. BROWN.
ATTACHMENT FOR WHEEL CULTIVATORS.
No. 363,278. Patented May 17, 1887.
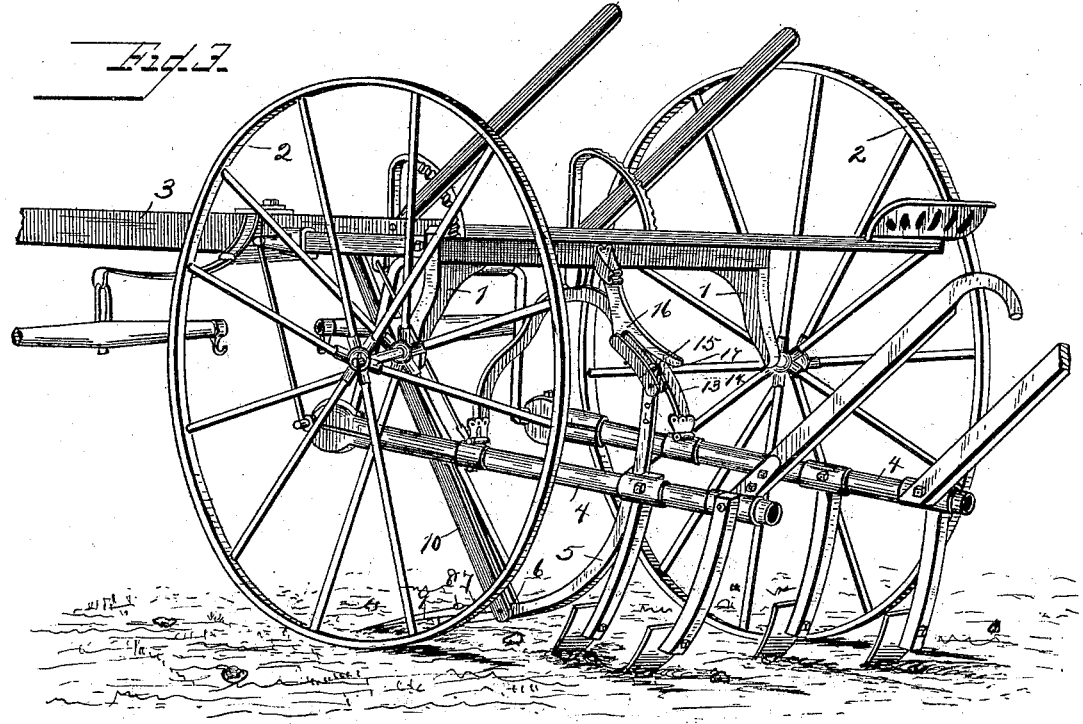
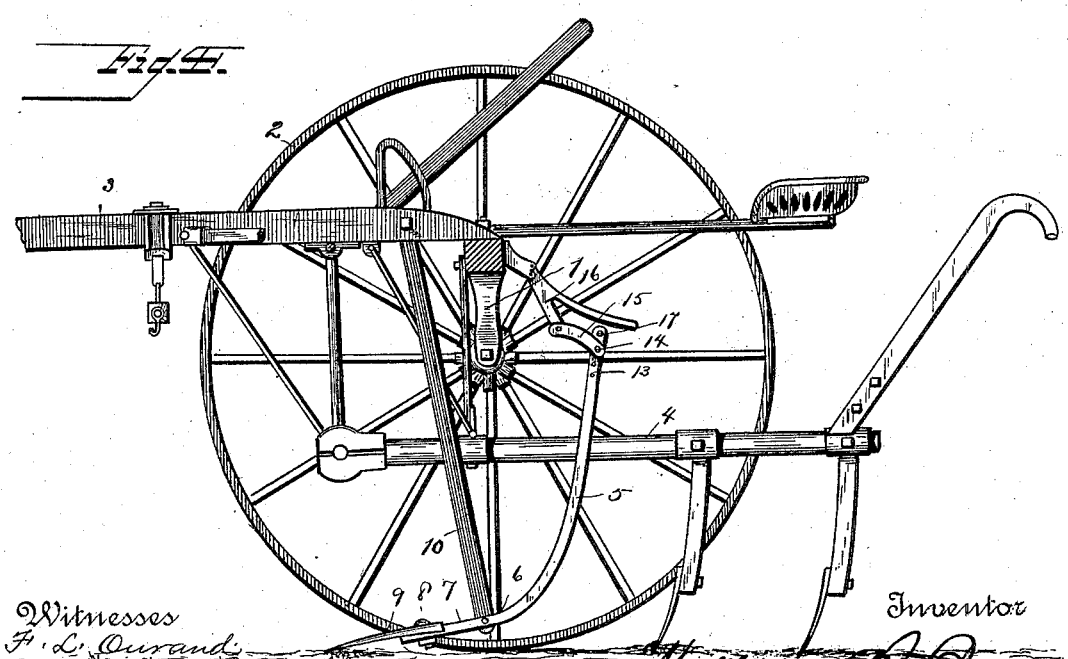
Witnesses
F. L. Durand
Benj. G. Cowl
Inventor
William R. Brown.
By his Attorneys
Louis Bagger & Co.

UNITED STATES PATENT OFFICE.

WILLIAM R. BROWN, OF GEORGETOWN, TEXAS.

ATTACHMENT FOR WHEEL-CULTIVATORS.

SPECIFICATION forming part of Letters Patent No. 363,278, dated May 17, 1887.

Application filed January 24, 1887. Serial No. 225,286. (No model.)

*To all whom it may concern:*

Be it known that I, WILLIAM R. BROWN, a citizen of the United States, and a resident of Georgetown, in the county of Williamson and State of Texas, have invented a certain new and useful Improvement in Attachments for Wheel-Cultivators; and I do hereby declare that the following is a full, clear, and exact description of the invention, which will enable others skilled in the art to which it appertains to make and use the same, reference being had to the accompanying drawings, which form a part of this specification, and in which—

Figure 1:
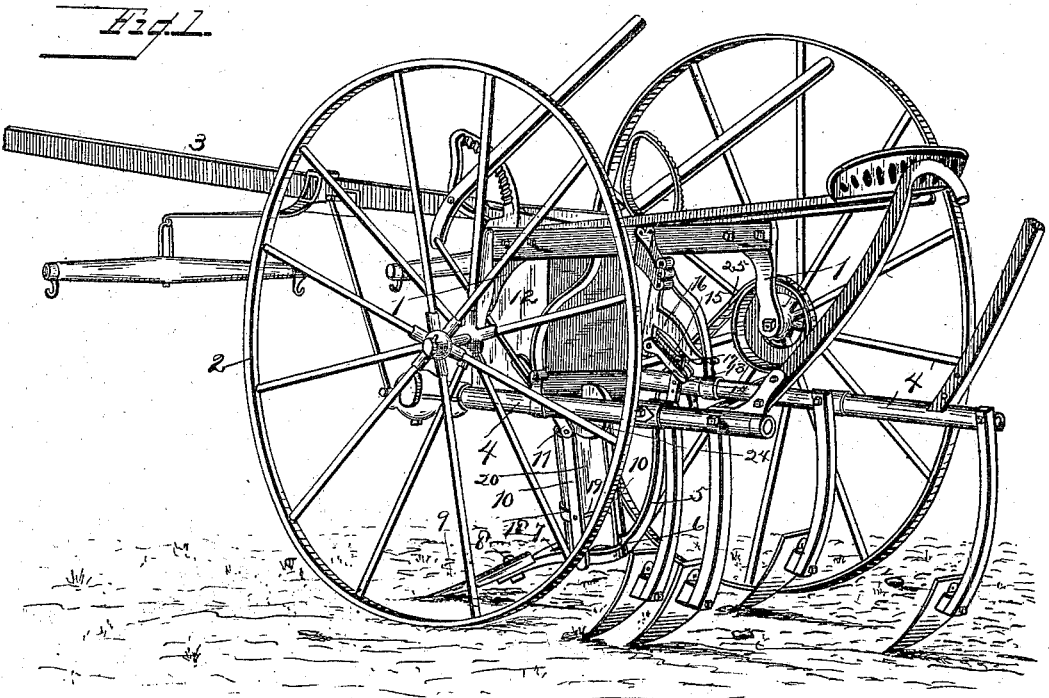
Figure 2:
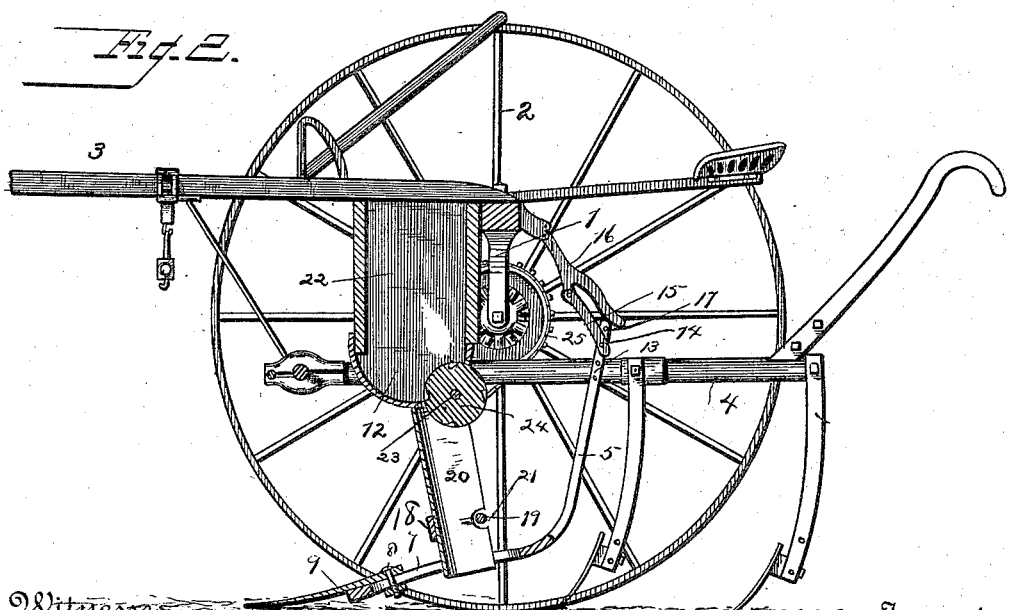

Figure 1 is a perspective view of a cultivator provided with my improvement, showing it used in planting. Fig. 2 is a longitudinal vertical sectional view of the same. Fig. 3 is a perspective view of a cultivator provided with my attachment, showing it used as a simple cultivator; and Fig. 4 is a longitudinal vertical sectional view of the same.

Similar numerals of reference indicate corresponding parts in all the figures.

My invention has relation to attachments for wheeled cultivators having a seeding attachment; and it consists in the improved construction and combination of parts of an attachment in which an opening-shovel is attached to the seed-spout when the seeding attachment is used and in the space between the inner pair of shovels when the seeding attachment is not used and the cultivator is simply used for cultivating the ground, as hereinafter more fully described and claimed.

In the accompanying drawings, the numeral 1 indicates the arched axle of the cultivator, which may be of any desired construction, and upon the ends of this axle are journaled the wheels 2, while the tongue 3 is secured to the middle of the axle, and the cultivator-beams 4 are supported below the frame in any suitable manner.

The attachment consists of a curved bar, 5, having an eye, 6, or loop formed in its forward end, which loop is preferably formed with a narrow forward extension or slot, 7, in which the nutted bolt 8 is adjusted, which secures the shovel or plow 9, which may be of any suitable shape.

Two arms, 10, are pivoted with their lower ends to the sides of the loop, and have their upper ends pivoted to lugs 11 upon the bottom of the seed-box 12 when the attachment is used with the seeding attachment, or to the sides of the tongue when the cultivator alone is used, the two arms used with the seeding attachment being shorter than the arms used without the seeding attachment.

The upwardly-curved rear portion of the curved bar is provided with a series of perforations, 13, and is pivoted upon a bolt, 14, in the lowermost of the said perforations, between the lower ends of two curved arms, 15, which are pivoted with their upper ends to a lever, 16, pivoted with its forward end upon the axle. A wooden break-pin, 17, is inserted into one of the series of perforations in the upper end of the curved bar or standard, and bears against the rear edges of the curved arms supporting the said bar or standard.

A curved strap, 18, is secured with its ends to the inner sides of the lower portions of the supporting-arms, having its curve projecting forward, and has a bolt, 19, projecting with its ends through the ends of the strap and through the arms, and the spout 20, which is open at its rear side, is placed with its lower end in the loop in the standard and rests with its closed forward side against the curved strap, and has two notches, 21, in its rear edges, which fit upon the bolt passing through the arms and through the ends of the curved strap, so that the spout will be prevented from sliding downward, and will be held securely in place, swinging with the supporting arms.

The upper end of the spout is immediately under the seed-aperture 22 in the seed-box, and this box is provided with the usual transverse seed-shaft, 23, having the seed-disk 24 and suitable gears, 25, by means of which the shaft may receive rotary motion from the drivewheel.

When the attachment is used together with the seeding attachment, the parts are supported as just described and the seed-box and its shaft and gears are in place; but when the cultivator is used as a simple cultivator the seed-box and all its appurtenances are removed, and the long arms are attached to the tongue and to the curved bar or standard in place of the short arms and the spout, which parts are detached, and the cultivator will now be provided with a central shovel or plow, which will travel in the space between the inner pair of shovels. It will thus be seen that I provide an attachment which may be easily attached and detached, and which may be used with a seeding apparatus or without, the additional shovel performing the function as opening-shovel for the seeding attachment and as central shovel in the cultivator.

Having thus described my invention, I claim and desire to secure by Letters Patent of the United States—

1. The combination, with a wheel-cultivator adapted to receive a seed-distributer, of a curved bar secured at its rear end to the axle of the cultivator, a shovel secured upon its forward end, and two arms, substantially as described, for supporting the forward end of said bar and said shovel.

2. The combination, with a wheel-cultivator, of a seed-distributer secured thereon, having a seed-spout, a curved bar the forward end of which is slotted and the rear end secured to the cultivator-axle, a shovel adjustably secured to the forward end of said bar, and two arms, substantially as described, for supporting the forward end of said bar.

3. The combination, with a wheel-cultivator, of a seed-distributer secured thereon, the spout of which is provided with notches upon its rear portion, a curved bar having its forward end slotted and its rear end secured to the cultivator, a shovel secured upon said slotted bar, two arms pivotally secured to the said distributer and to the curved bar, and a rod connected at its ends to said arms and engaging with its intermediate portion with said notches.

In testimony that I claim the foregoing as my own I have hereunto affixed my signature in presence of two witnesses.

his
WILLIAM R. × BROWN.
       mark

Witnesses:
 J. W. HODGES,
 SIDNEY SEYMOUR.